US012764619B2

(12) United States Patent
Lovison et al.

(10) Patent No.: US 12,764,619 B2
(45) Date of Patent: Oct. 13, 2026

(54) DIRECTIONAL NEIGHBOR REPORTS FOR ROAMING OPTIMIZATION

(71) Applicant: Cisco Technology, Inc., San Jose, CA (US)

(72) Inventors: Federico Lovison, Vimercate (IT); Sukrit Dasgupta, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 18/600,414

(22) Filed: Mar. 8, 2024

(65) Prior Publication Data

US 2024/0306054 A1 Sep. 12, 2024

Related U.S. Application Data

(60) Provisional application No. 63/489,706, filed on Mar. 10, 2023.

(51) Int. Cl.
*H04W 36/00* (2009.01)
*H04W 16/18* (2009.01)

(52) U.S. Cl.
CPC ..... *H04W 36/00835* (2018.08); *H04W 16/18* (2013.01)

(58) Field of Classification Search
CPC ........... H04W 36/00835; H04W 16/18; H04W 84/12; H04W 36/0061; H04W 36/324; H04W 36/32
USPC ....................................................... 455/432.1
See application file for complete search history.

(56) References Cited

U.S. PATENT DOCUMENTS

2014/0098682 A1* 4/2014 Cao ............... H04W 36/008357 370/252
2015/0264614 A1 9/2015 Stager et al.
2016/0112942 A1 4/2016 Chang et al.
2018/0070295 A1* 3/2018 Henry ................... H04W 48/16
2018/0234901 A1 8/2018 Suh et al.
2020/0008169 A1* 1/2020 Henry ............. H04W 36/00835
2022/0030453 A1 1/2022 Kumar
(Continued)

FOREIGN PATENT DOCUMENTS

WO 2014089051 A1 6/2014
WO 2021074673 A1 4/2021
WO 2021123285 A1 6/2021

OTHER PUBLICATIONS

PCT International Searching Authority, International Search Report and Written Opinion for PCT/US2024/019133 mailed on Jun. 6, 2024; 17 pages.

*Primary Examiner* — Don N Vo
(74) *Attorney, Agent, or Firm* — Merchant & Gould P.C.

(57) ABSTRACT

Roaming optimization, and particularly transmitting directional neighbor reports to optimize roaming may be provided. For roaming optimization, it is first determined that a client is going to roam to a new Access Point (AP). In response to determining the client is going to roam to a new AP, an estimated path of the client is determined. One or more candidate APs are determined based at least in part on the estimated path, and probabilities of roaming to the one or more candidate APs is determined based at least in part on the estimated path. A directional neighbor report including a list of the one or more candidate APs and the probabilities is generated and transmitted to the client.

20 Claims, 4 Drawing Sheets

(56) References Cited

U.S. PATENT DOCUMENTS

| | | | | |
|---|---|---|---|---|
| 2022/0116838 | A1* | 4/2022 | Kumar | H04W 36/0058 |
| 2023/0029760 | A1 | 2/2023 | Gupta et al. | |
| 2023/0140473 | A1* | 5/2023 | Paredes Cabrera | H04W 36/008375 455/456.1 |
| 2023/0413115 | A1 | 12/2023 | Sarawat et al. | |

* cited by examiner

DIRECTIONAL NEIGHBOR REPORTS FOR ROAMING OPTIMIZATION

RELATED APPLICATION

Under provisions of 35 U.S.C. § 119(e), Applicant claims benefit of U.S. Provisional Application No. 63/489,706, filed Mar. 10, 2023, which is incorporated herein by reference.

TECHNICAL FIELD

The present disclosure relates generally to roaming optimization, and particularly to transmitting directional neighbor reports to optimize roaming.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
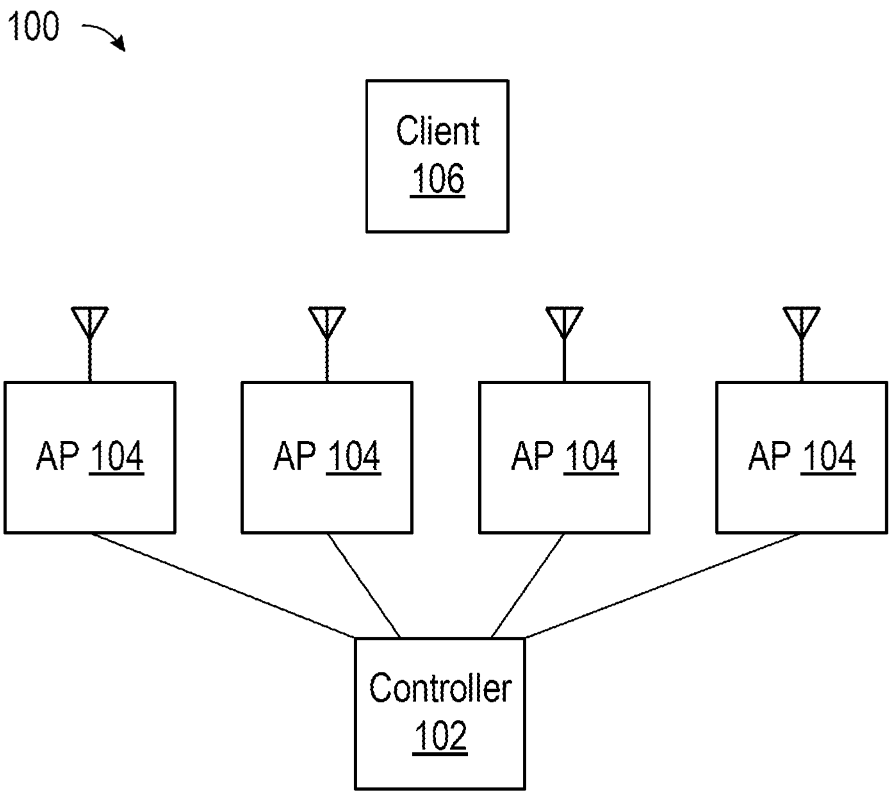
FIG. 1 is a block diagram of an operating environment for client roaming.

Roaming optimization, and particularly transmitting directional neighbor reports to optimize roaming may be provided. For roaming optimization, it is first determined that a client is going to roam to a new Access Point (AP). In response to determining the client is going to roam to a new AP, an estimated path of the client is determined. One or more candidate APs are determined based at least in part on the estimated path, and probabilities of roaming to the one or more candidate APs is determined based at least in part on the estimated path. A directional neighbor report including a list of the one or more candidate APs and the probabilities is generated and transmitted to the client.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Roaming in Wi-Fi occurs when a client device moves outside of the range of an Access Point (AP) and connects to a new AP the client device is in range of. However, the client's connection can be disrupted if the client device does not have accurate information on how to quickly identify the best candidate AP(s) to roam to. Roaming decisions (i.e., which AP to transfer the connection to) are typically made by the client device, but there are ways for the network and associated devices to assist the client decision making. For example, the Institute of Electrical and Electronics Engineers (IEEE) 802.11k amendment describes a process to create and share a neighbor report, a list of neighbor APs, so clients may not need to perform a full scan across one or more entire radio bands to identify available APs and/or may not connect to an overutilized or otherwise congested AP simply because that AP has the strongest signal at the time the client determines to roam to a new AP.

As wireless networks continue to extend the available spectrum and high-density deployments, the complexity and/or amount of information included in the neighbor reports, such as the Radio Resource Management (RRM) information about neighbor APs and the channels they operate, can result a long list of channels for a device to scan when roaming to a new AP, leading to slow or otherwise inefficient roaming and potential connection disruptions. This problem can be exacerbated when client devices are moving quickly, such as in a vehicle. Therefore, improvements to neighbor report creation and transmission to client devices are described herein to address these issues that can result in degraded roaming performance.

Algorithms may be implemented to predict the roaming path of clients, and APs can implement an extension to the existing neighbor report messages described by IEEE 802.11k to provide the clients with directional information. A client can use the directional information to identify APs along the predicted path of the client and prioritize scanning on channels where the identified APs are operating. The described techniques can enable optimized or otherwise improved scanning time required by the client to identify which AP to roam to, increasing the reliability of the client's connection to the network.

FIG. 1 is a block diagram of an operating environment 100 for client roaming. The operating environment 100 may include a controller 102, four APs 104, and a client 106. The controller 102 may be any network controller (e.g., a Wireless Local Area Network (WLAN) controller) and may manage the APs 104 to allow wireless devices such as the client 106 to connect to the network. In some examples, the APs 104 may connect directly to the network or connect through a gateway device not shown. In some embodiments, the operations of the controller 102 described herein may be performed by one or more of the APs 104 and/or another device, and vice versa. The APs 104 have a wired connection to the controller 102 in this example but may wirelessly connect to the controller 102 in other examples. The operating environment 100 is an example configuration and there may be a different number of controllers 102, APs 104, clients 106, and/or other devices in further examples.

The AP 104 the client 106 is currently communicating with or otherwise connected to, also referred to as the connected AP 104 herein, can provide the client 106 with a neighbor report to the client 106. The client 106 may use the neighbor report when roaming to another AP 104, for example when moving outside of the range of the connected AP 104 and into the range of one or more other APs 104. The client 106 may use the neighbor report to optimize or otherwise improve the speed at which the client 106 roams to a new AP 104. For example, the client 106 may use the neighbor report to reduce the time spent scanning the channel to identify available APs 104 and roam to the next AP 104 more quickly and efficiently (i.e., reducing client 106 usage of airtime, reducing client 106 power consumption, conserving client 106 resources, conserving AP 104 resources, etc.).

In some examples, the connected AP 104 and/or the controller 102 may generate the neighbor report in response to receiving a neighbor report request from the client 106. The client 106 may generate the neighbor report request in response to determining that the client 106 is moving outside of the range of the connected AP 104 (e.g., the client 106 identifies signal quality dropping using a Received Signal Strength Indicator (RSSI) and/or the like, identifying stronger signals from other APs, knowing the position of the edge of the connected AP 104 range, etc.). In other examples, the connected AP 104 and/or the controller 102 may generate a neighbor report in response to identifying that the client 106 is moving in a manner that will cause the client 106 to be outside of the range of the connected AP 104. The client 106 may use the neighbor report to determine which of the APs 104 to connect to.

A neighbor report may include information about neighboring APs 104 that the connected AP 104 and/or the controller 102 identifies or otherwise recognizes as a candidate for the client 106 to connect to. For example, the neighbor report can include information about the Basic Service Set Identifier (BSSID) (e.g., the reachability of the AP 104, the security and capabilities of the AP 104, the mobility domain of the AP 104), the channel (e.g., Operating Class and Channel Number to specify channel frequency and spacing), and the operation details (e.g., last known operating channel, Physical (PHY) layer type) of the candidate APs 104.

Additionally, to improve the accuracy and relevance of the neighbor report, the controller 102 and/or the connected AP 104 may select candidate APs 104 to include in the neighbor report based on the estimated path of the client 106 to generate a directional neighbor report. The controller 102 and/or the connected AP 104 may also determine the probability that the client 106 should select a candidate AP 104 to roam to based on the estimated path of the client 106. For example, the controller 102 and/or the connected AP 104 may assign weights to the candidate APs 104 that indicate the probability the client 106 should connect to each candidate AP 104. The directional neighbor report may include different APs 104 than a typical neighbor report because of the determination to include APs 104 based on the estimated movement of the client 106.

The directional neighbor report may enable the client 106 to perform faster and more reliable roaming decisions compared to utilizing no neighbor report or a typical neighbor report, because the directional neighbor report prioritizes or restricts the channel scanning of the client 106 to candidate APs 104 that will be in range of the estimated path of the client 106. Additionally, the directional neighbor report may enable the client 106 to reduce the number of times the client 106 roams to a new AP 104 since the directional neighbor report may include APs 104 the client 106 will be in range of for a longer period of time when moving in the estimated direction (e.g., path) of travel than with APs 104 identified in a typical neighbor report.

When generating the directional neighbor report, the controller 102 and/or connected AP 104 may set a flag in the directional neighbor report frame to indicate to the client 106 that it is receiving a directional neighbor report instead of a typical neighbor report. For example, the flag may be part of the BSSID information element of the directional neighbor report frame. The controller 102 and/or connected AP 104 may also include the computed probability of roaming to the candidate APs 104 in the directional neighbor report indicating the determined likelihood the client 106 should connect to a respective candidate AP 104 (e.g., as indicated by the weights assigned to the candidate APs 104). The directional neighbor report may also include information on how the probabilities were determined. For example, the directional neighbor report may include the estimated path of the client 106, the algorithm used to estimate the path, the algorithm used to determine the probabilities of roaming to the candidate APs 104, and/or the like. Thus, the directional neighbor report may have the same frame type as a typical neighbor report but with additional information included in the frame.

Figure 2:
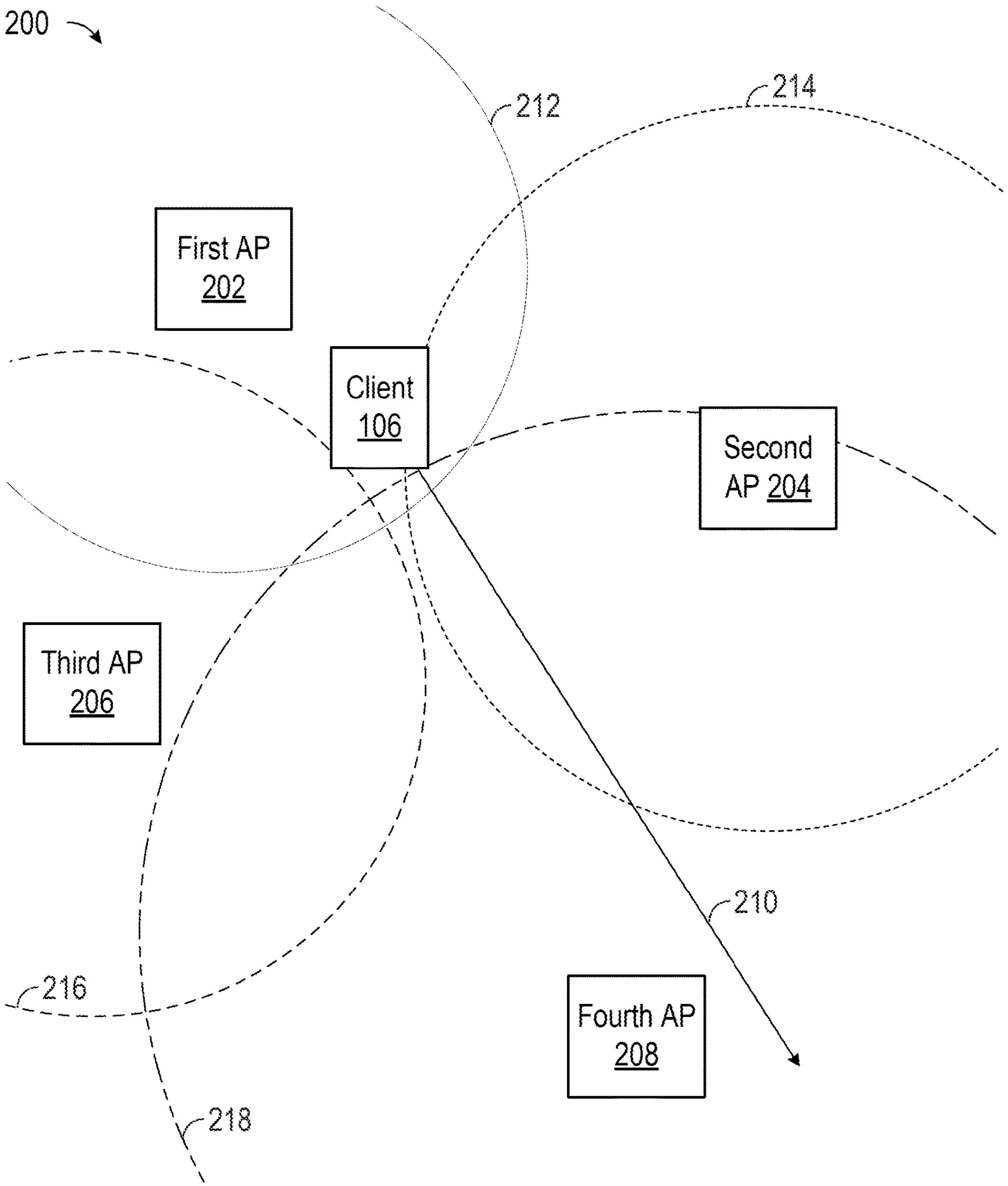
FIG. 2 is a block diagram of a second operating environment for client roaming.

FIG. 2 is a block diagram of a second operating environment 200 for client roaming. The second operating environment 200 may include a first AP 202, a second AP 204, a third AP 206, a fourth AP 208, and the client 106. The first AP 202, the second AP 204, the third AP 206, and the fourth AP 208 may be the APs 104 shown in FIG. 1 with identifying labels for the convenience and clarity of the following description.

The second operating environment 200 may also include the estimated path 210 indicating the estimated path of travel of the client 106, the range of the first AP 202 indicated by the first AP range boundary 212, the range of the second AP 204 indicated by the second AP range boundary 214, the range of the third AP 206 indicated by the third AP range boundary 216, and the range of the fourth AP 208 indicated by the fourth AP range boundary 218. The first AP range boundary 212, the second AP range boundary 214, the third AP range boundary 216, and the fourth AP range boundary 218 are shown for example purposes only, and the AP ranges may be different in other examples. For example, the client 106 may be in the range of the first AP 202, the second AP 204, the third AP 206, and the fourth AP 208 at its shown position, with a high enough RSSI associated with the second AP 204, the third AP 206, and the fourth AP 208, to consider connecting to one of the second AP 204, the third AP 206, or the fourth AP 208.

The client 106 may be currently connected to the first AP 202 and moving outside of the range of the first AP 202 as shown by the estimated path 210 moving outside of the first AP range boundary 212. The client 106 may transmit a neighbor report request to the first AP 202 or the first AP 202 and/or the controller 102 may determine the client will be moving outside of the range of the first AP 202. In response, the controller 102 and/or the first AP 202 may generate a directional neighbor report to transmit to the client 106.

To generate the directional the first AP 202 and/or the controller 102 may first determine the estimated path 210 of the client 106. The first AP 202 and/or the controller 102 may use algorithms, such as artificial intelligence techniques (e.g., machine learning, deep learning, etc.), to analyze the roaming history of the client, identify patterns of the client, and/or the like to determine the estimated path 210. When the client 106 is positioned to roam to a new AP 104, the algorithm may generate a prediction of which AP 104 the client 106 will connect to of the candidate APs 104. The controller 102 and/or the first AP 202 may use the algorithm to assign a weight to each candidate AP 104.

The controller 102 and/or the first AP 202 may predict the estimated path 210 by considering the roaming patterns of the client 106 (e.g., the sequence of APs 104 the client 106 has connected to, inferring the moving speed of the client 106 by observing the dwell time of the client 106 at each AP 104 on its path, the client 106 RSSI variation over time, and/or the like). The controller 102 and/or the first AP 202 may use the estimated path to compute the probability of the client roaming to each of the neighbor APs 104. The controller 102 and/or the first AP 202 may also consider the Service Set Identifier (SSID) the client 106 is associated to as well as the probability of a roaming success to each neighbor AP 104, therefore penalizing neighbor APs 104 with a high failure rate.

The controller 102 may identify second AP 204 and the fourth AP 208 as candidate APs because the estimated path 210 predicts that the client will be in the second AP range boundary 214 and the fourth AP range boundary 218. The controller 102 may exclude the third AP 206 from the candidate APs because the estimated path 210 predicts that the client will not be in the third AP range boundary 216. Because the client 106 is within range of the third AP 206 at the time the client 106 determines to roam, the third AP 206 may be included in typical neighbor reports when the device creating the typical neighbor report has not estimated the path of the client 106. Therefore, the client 106 could roam to the third AP 206 using a typical roaming report and quickly need to roam to the second AP 204 or the fourth AP 208 because the client 106 is moving along the estimated path 210 outside of the second AP range boundary 214. The directional neighbor report remedies this potential inefficient operation by excluding the second AP 204 from the list of candidate APs 104.

Additionally, the controller 102 may assign weights to the second AP 204 and the fourth AP 208 to indicate the probability the client 106 should connect to the second AP 204 or the fourth AP 208. For example, the controller 102 may assign a higher weight to the fourth AP 208 compared to the weight the controller assigns to the second AP 204 because the estimated path 210 predicts the client will be within the fourth AP range boundary 218 longer than the second AP range boundary 214, among other considerations. The client 106 may then use the weights to evaluate candidate APs 104 when selecting a new AP 104 to roam to.

As described above, the directional neighbor report may utilize the typical neighbor report frame and add additional information, such as the predicted path of the client 106, the probabilities of roaming to the candidate APs 104 (e.g., including the determined weights that indicate the probability of roaming to each AP 104), the methods used to determine the predicted path, the methods used to determine the probabilities, and/or the like. The probabilities (e.g., weights) may be transmitted as part of the BSSID information element. The directional neighbor report frame can also include a flag that indicates whether the frame is a directional neighbor report or a typical neighbor report. The controller 102 and/or the connected AP 104 may set the flag to indicate to the client 106 that the frame is a directional neighbor report. The flag may be part of the BSSID information element.

Figure 3:
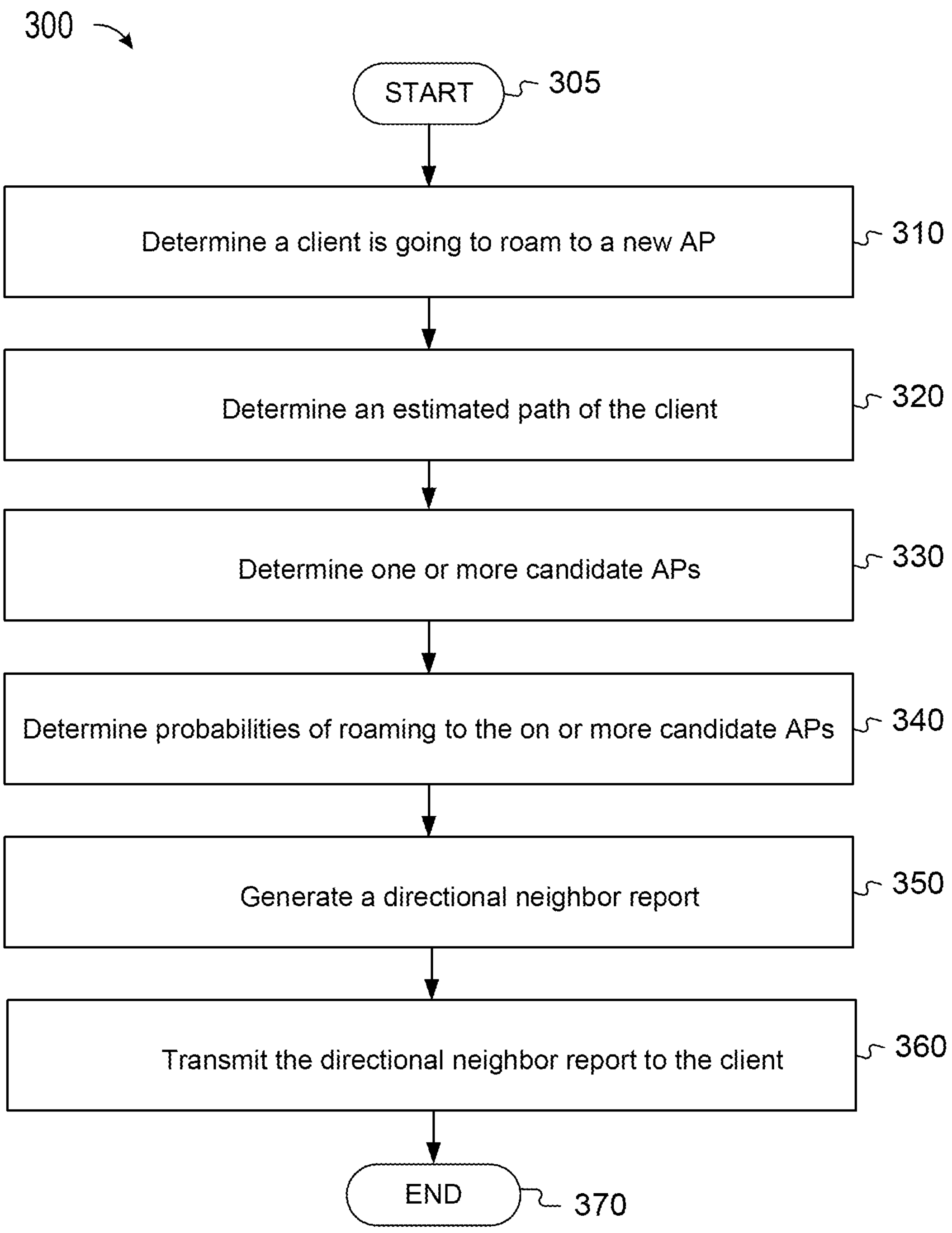
FIG. 3 is a flow chart of a method for client roaming.

FIG. 3 is a flow chart of a method 300 for client roaming. The method 300 may begin at starting block 305 and proceed to operation 310. In operation 310, it is determined that a client is going to roam to a new AP. For example, the controller 102 receives a neighbor report request from the client 106 and/or determines the client 106 is moving outside of the range of a connected AP 104 (e.g., the client 106 moving outside of the first AP range boundary 212).

In operation 320, an estimated path of the client is determined. For example, the controller 102 determines the estimated path 210 of the client 106 in response to determining the client 106 is going to roam to a new AP 104. In operation 330, one or more candidate APs are determined based at least in part on the estimated path. For example, the controller 102 determines the second AP 204 and the fourth AP 208 are candidate APs based at least in part on the estimated path 210. The controller 102 may determine the estimated path 210 using an artificial intelligence algorithm as described above. The controller 102 may determine the estimated path 210 based on the roaming patterns of the client, such as a sequence of APs the client has connected to, the movement speed of the client, RSSI variation of the client 106 over time, and/or the like.

In operation 340, probabilities of roaming to the one or more candidate APs are determined based at least in part on the estimated path. For example, the controller 102 determines probabilities the client 106 should roam to the candidate APs and assigns weights to the candidate APs indicating the probabilities. The controller 102 may determine the probabilities based on the estimated path, the SSID the client 106 is associated to, the probability of a roaming success to each candidate AP 104, and/or the like. The controller 102 may determine the probabilities using an artificial intelligence algorithm as described above.

In operation 350, a directional neighbor report is generated including a list of the one or more candidate APs and the probabilities. The directional neighbor report can also include the estimated path, information on how the estimated path was determined (e.g., the algorithms used, the information used to estimate the path, etc.), and information on how the probabilities were determined (e.g., the algorithms used, the information used to determine the probabilities, etc.). The directional neighbor report can further include a flag indicating to the client that the directional neighbor report is a directional neighbor report instead of a typical neighbor report.

In operation 360, the directional neighbor report is transmitted to the client. For example, the controller 102 causes the connected AP 104 to transmit the directional neighbor report to the client 106. The method 300 may conclude at ending block 370.

Figure 4:
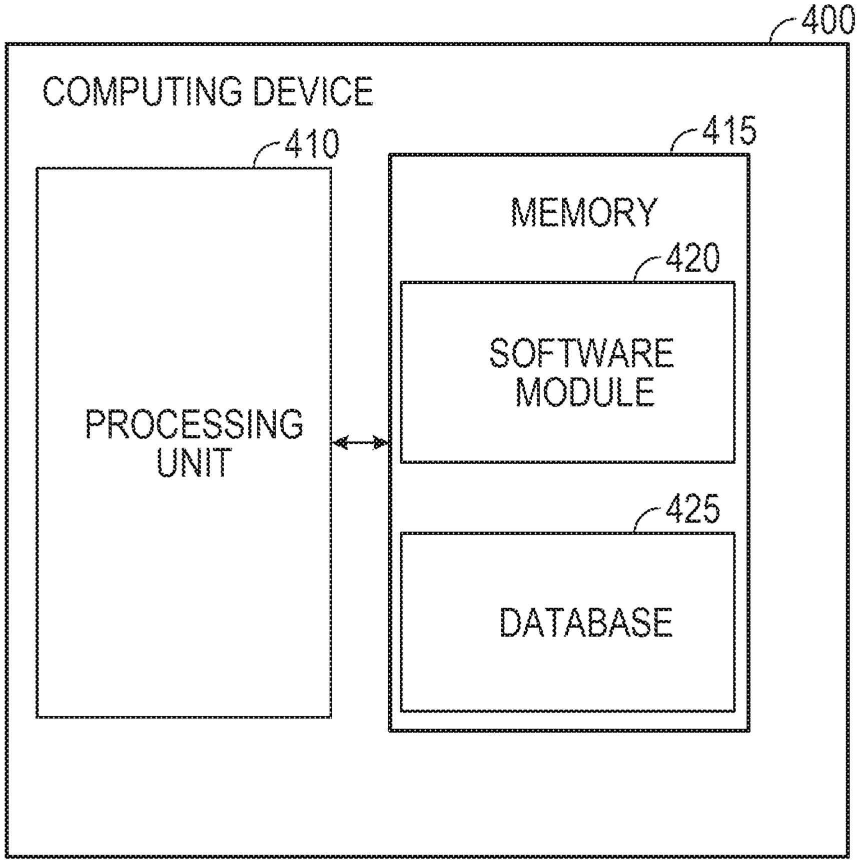
FIG. 4 is a block diagram of a computing device.

FIG. 4 is a block diagram of a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for roaming optimization with respect to FIG. 1, FIG. 2, and FIG. 3. Computing device 400, for example, may provide an operating environment for the controller 102, the APs 104, the client 106, the first AP 202, the second AP 204, the third AP 206, the fourth AP 208, and the like. The controller 102, the APs 104, the client 106, the first AP 202, the second AP 204, the third AP 206, the fourth AP 208, and the like may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:

determining a client is going to roam to a new Access Point (AP); and in response to determining the client is going to roam to a new AP:

determining an estimated path of the client, determining one or more candidate APs based at least in part on the estimated path, determining probabilities of roaming to the one or more candidate APs based at least in part on the estimated path, generating a directional neighbor report including a list of the one or more candidate APs, the probabilities, and a flag indicating to the client that the directional neighbor report is a directional neighbor report instead of a typical neighbor report, and transmitting the directional neighbor report to the client.

2. The method of claim 1, wherein determining the client is going to roam to the new AP is based on any one of (i) receiving a neighbor report request from the client, (ii) determining the client is moving outside a range of a connected AP, or (iii) a combination of (i) and (ii).

3. The method of claim 1, wherein determining the estimated path of the client comprises utilizing an artificial intelligence algorithm.

4. The method of claim 1, wherein determining the estimated path of the client comprises considering roaming patterns of the client, including any one of: (i) a sequence of APs the client has connected to, (ii) a movement speed of the client, (iii) a Received Signal Strength Indicator (RSSI) variation over time, or (iv) any combination of (i)-(iii).

5. The method of claim 1, wherein determining the probabilities of roaming to the one or more candidate APs comprises assigning weights to the one or more candidate APs indicating the probabilities.

6. The method of claim 1, wherein the directional neighbor report further comprises the estimated path, information on how the estimated path was determined, and information on how the probabilities were determined.

7. A system comprising:

a memory storage; and a processing unit coupled to the memory storage, wherein the processing unit is operative to:

determine a client is going to roam to a new Access Point (AP); and in response to determining the client is going to roam to a new AP:

determine an estimated path of the client, determine one or more candidate APs based at least in part on the estimated path, determine probabilities of roaming to the one or more candidate APs based at least in part on the estimated path, generate a directional neighbor report including a list of the one or more candidate APs, the probabilities, the estimated path, information on how the estimated path was determined, and information on how the probabilities were determined, and cause a connected AP to transmit the directional neighbor report to the client.

8. The system of claim 7, wherein to determine the probabilities of roaming to the one or more candidate APs is further based on a service set identifier of the client and a probability of roaming success to each candidate AP.

9. The system of claim 7, wherein to determine the client is going to roam to the new AP is based on any one of (i) to receive a neighbor report request from the client, (ii) to determine the client is moving outside a range of the connected AP, or (iii) a combination of (i) and (ii).

10. The system of claim 7, wherein to determine the estimated path of the client comprises considering roaming patterns of the client, including any one of: (i) a sequence of APs the client has connected to, (ii) a movement speed of the client, (iii) a Received Signal Strength Indicator (RSSI) variation over time, or (iv) any combination of (i)-(iii).

11. The system of claim 7, wherein the directional neighbor report further comprises a flag indicating to the client that the directional neighbor report is a directional neighbor report instead of a typical neighbor report.

12. The system of claim 7, wherein to determine the probabilities of roaming to the one or more candidate APs comprises to assign weights to the one or more candidate APs indicating the probabilities.

13. The system of claim 7, wherein to determine the estimated path of the client comprises to utilize an artificial intelligence algorithm.

14. The method of claim 1, wherein determining the probabilities of roaming to the one or more candidate APs is further based on a service set identifier of the client and a probability of roaming success to each candidate AP.

15. A non-transitory computer-readable medium that stores a set of instructions which when executed perform a method executed by the set of instructions comprising:

determining a client is going to roam to a new Access Point (AP); and in response to determining the client is going to roam to a new AP:

determining an estimated path of the client, determining one or more candidate APs based at least in part on the estimated path, determining probabilities of roaming to the one or more candidate APs based at least in part on the estimated path, generating a directional neighbor report including a list of the one or more candidate APs, the probabilities, a flag indicating to the client that the directional neighbor report is a directional neighbor report instead of a typical neighbor report, and transmitting the directional neighbor report to the client.

16. The non-transitory computer-readable medium of claim 15, wherein determining the client is going to roam to the new AP is based on any one of (i) receiving a neighbor report request from the client, (ii) determining the client is moving outside a range of a connected AP, or (iii) a combination of (i) and (ii).

17. The non-transitory computer-readable medium of claim 15, wherein determining the estimated path of the client comprises utilizing an artificial intelligence algorithm.

18. The non-transitory computer-readable medium of claim 15, wherein the directional neighbor report further comprises the estimated path, information on how the estimated path was determined, and information on how the probabilities were determined.

19. The non-transitory computer-readable medium of claim 15, wherein determining the probabilities of roaming to the one or more candidate APs comprises assigning weights to the one or more candidate APs indicating the probabilities.

20. The non-transitory computer-readable medium of claim 15, wherein determining the estimated path of the client comprises considering roaming patterns of the client, including any one of: (i) a sequence of APs the client has connected to, (ii) a movement speed of the client, (iii) a Received Signal Strength Indicator (RSSI) variation over time, or (iv) any combination of (i)-(iii).

* * * * *